US008836485B2

(12) United States Patent
Murakami et al.

(10) Patent No.: US 8,836,485 B2

(45) Date of Patent: Sep. 16, 2014

(54) REMOTE CONTROL SYSTEM AND MOBILE DEVICE

(75) Inventors: Hiroko Murakami, Toyota (JP); Hiroki Okada, Toyota (JP); Arinobu Kimura, Toyota (JP); Kazuhiro Nakashima, Anjo (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 349 days.

(21) Appl. No.: 13/257,763

(22) PCT Filed: Mar. 23, 2010

(86) PCT No.: PCT/IB2010/000642

§ 371 (c)(1), (2), (4) Date: Sep. 20, 2011

(87) PCT Pub. No.: WO2010/109295

PCT Pub. Date: Sep. 30, 2010

(65) Prior Publication Data

US 2012/0007724 A1 Jan. 12, 2012

(30) Foreign Application Priority Data

Mar. 24, 2009 (JP) ................................ 2009-071479

(51) Int. Cl.

*G05B 11/01* (2006.01)
*G08C 19/16* (2006.01)
*G08C 17/02* (2006.01)

(52) U.S. Cl.

CPC ............ *G08C 17/02* (2013.01); *G08C 2201/63* (2013.01)

USPC ... 340/12.5; 340/12.22; 340/13.2; 340/13.27; 340/13.33; 701/2; 701/36; 701/51; 701/58; 701/66; 180/167; 180/205.3; 180/206.2; 180/315; 318/580; 318/581

(58) Field of Classification Search

USPC ............. 340/12.5, 12.22, 13.27, 13.2, 13.33; 701/2, 36, 51, 53, 58, 66; 180/167, 180/205.3, 206.2, 315; 455/20, 23, 42, 62, 455/63.3, 71, 113

See application file for complete search history.

(56) References Cited

U.S. PATENT DOCUMENTS 5,387,906 A * 2/1995 Lee ............................ 340/12.17
2007/0052548 A1* 3/2007 Hankin et al. ........... 340/825.69

(Continued)

FOREIGN PATENT DOCUMENTS

EP 0 952 283 A2 10/1999
EP 1 598 991 A1 11/2005

(Continued)

OTHER PUBLICATIONS

Japanese Office Action issued in Japanese Application No. 2009-071479 dated Sep. 19, 2012 (w/partial translation).

(Continued)

*Primary Examiner* — George Bugg
*Assistant Examiner* — Anthony D Afrifa-Kyei
(74) *Attorney, Agent, or Firm* — Oliff PLC

(57) ABSTRACT

A remote control system includes a mobile device and a receiver connected to a control target. The mobile device includes an input unit accepting user's input operation; an operation signal transmission unit wirelessly transmitting an operation signal corresponding to the input operation during the input operation; a frequency switching determination unit determining whether to switch the transmission frequency band from a first frequency band to a second frequency band based on at least any one of a manner of the input operation and a state of wireless communication; and a transmission frequency switching unit switching the transmission frequency band when the frequency switching determination unit determines to switch the transmission frequency band. The receiver includes an operation signal reception unit receiving the operation signal; and a control unit controlling the control target on the basis of the received operation signal.

12 Claims, 9 Drawing Sheets

(56) References Cited

U.S. PATENT DOCUMENTS

2007/0115096 A1* 5/2007 Suzuki et al. ................ 340/5.72
2010/0007513 A1* 1/2010 Horky et al. ............. 340/825.22

FOREIGN PATENT DOCUMENTS

EP 1598991 A1 * 11/2005
JP A-2008-060942 3/2008
JP A-2008-82152 4/2008
JP A-2009-33529 2/2009

OTHER PUBLICATIONS

International Search Report in International Application No. PCT/IB2010/000642; dated Aug. 26, 2010,.

Written Opinion of the International Searching Authority in International Application No. PCT/IB2010/000642; dated Aug. 26, 2010.

* cited by examiner

SWITCH INPUT SIGNAL

COMMUNICATION ESTABLISHMENT SIGNAL

TRANSMISSION FREQUENCY BAND
F1
F2
Tγ1 (=TWth)
Tγ2 (<TWth)
tγ1
tγ2
tγ3
tγ4
TIME

REMOTE CONTROL SYSTEM AND MOBILE DEVICE

BACKGROUND OF THE INVENTION

1. Field of the Invention

The invention relates to a remote control system and a mobile device and, more particularly, to a remote control system and mobile device that control an in-vehicle device.

2. Description of the Related Art

There has been developed a remote control system in the existing art. In the remote control system, a user operates a mobile device to transmit a wireless signal from the mobile device and then an in-vehicle device, such as a door lock device, is controlled in response to the wireless signal.

Japanese Patent Application Publication No. 2008-60942 (JP-A-2008-60942) describes an example of a mobile device used in the above remote control system. The mobile device described in JP-A-2008-60942 wirelessly transmits a command signal for controlling a control target in response to user's input. The mobile device is able to transmit wireless signals of a plurality of different frequencies, and transmits the command signal at one frequency set as a transmission frequency among the plurality of frequencies. Then, the user carries out a predetermined operation to change the transmission frequency to any one of the plurality of frequencies.

With the mobile device described in JP-A-2008-60942, when a wireless signal having a set transmission frequency is not normally received by a receiver because of the influence of noise, or the like, of electromagnetic waves and then communication is not established between the mobile device and the receiver, the user carries out an operation for switching the set transmission frequency to thereby make it possible to change the transmission frequency to a frequency that is insusceptible to the influence of noise, or the like. That is, the user carries out an operation for switching the transmission frequency to thereby make it possible to improve the capability of establishing communication between the mobile device and the receiver.

However, in the mobile device described in JP-A-2008-60942, the set transmission frequency cannot be changed until the user carries out an operation for switching the transmission frequency. Thus, under a situation that communication between the mobile device and the receiver is not established, unless the user carries out an operation for switching the transmission frequency, it may be impossible to establish communication between the mobile device and the receiver.

SUMMARY OF THE INVENTION

The invention provides a remote control system and mobile device that achieve a high communication success rate with less number of operations.

A first aspect of the invention relates to a remote control system that includes a mobile device and a receiver connected to a control target. The mobile device includes an input unit that accepts user's input operation; an operation signal transmission unit that wirelessly transmits an operation signal corresponding to the input operation while the input operation is being carried out; a frequency switching determination unit that determines whether to switch a transmission frequency band for transmitting the operation signal among a plurality of frequency bands, wherein the frequency switching determination unit determines whether to switch the transmission frequency band from a first frequency band to a second frequency band on the basis of at least any one of a manner of the input operation and a state of wireless communication; and a transmission frequency switching unit that switches the transmission frequency band when the frequency switching determination unit determines to switch the transmission frequency band. The receiver includes an operation signal reception unit that receives the operation signal; and a control unit that controls the control target on the basis of the operation signal received by the operation signal reception unit.

With the first aspect of the invention, in the remote control system that wirelessly transmits an operation signal for controlling a control target in a set transmission frequency band, it is determined whether to switch the transmission frequency band on the basis of a manner of the input operation or a state of wireless communication, and the transmission frequency band is automatically switched. Thus, it is possible to switch the transmission frequency band without user's input operation for switching the transmission frequency band. Therefore, for example, even when, under a situation that wireless communication in the frequency band set as the transmission frequency band is interfered because of the influence of noise, or the like, the user does not recognize the interference, the transmission frequency band is automatically switched, so it is possible to wirelessly transmit an operation signal in a frequency band that is less influenced by noise. In this way, by transmitting an operation signal in the frequency band that is less influenced by noise, the success rate of communication of the operation signal may be improved.

In the first aspect, the mobile device may further include an operation type determination unit that determines whether the accepted input operation is a first input operation or a second input operation different from the first input operation on the basis of details of the input operation; and a storage unit that stores the type of a previously accepted input operation, wherein the frequency switching determination unit may determine whether to switch the transmission frequency band each time the user completes the input operation, and, when the type of the previously accepted input operation differs from the type of a currently accepted input operation, may determine not to switch the transmission frequency band after the user completes the current input operation.

With the above configuration, an operation signal transmitted in correspondence with a subsequently accepted input operation (hereinafter, referred to as subsequent operation signal) is transmitted in the same transmission frequency band as an operation signal transmitted in correspondence with a currently accepted input operation (hereinafter, referred to as current operation signal). When communication of the current operation signal is successfully carried out, it is presumably less likely that communication in the frequency band in which the communication has been successfully carried out is interfered. Therefore, by transmitting a subsequent operation signal in the same frequency band as that of the current operation signal, communication of the subsequent operation signal may also be successfully carried out at a high probability.

In the above configuration, the input unit may be a press-down switch, the operation type determination unit, when the details of the accepted input operation are such that the switch device is continuously depressed for a predetermined period of time or longer, may determine that the input operation is the first input operation, and, when the details of the accepted input operation are such that a period of time during which the switch device is continuously depressed does not reach the predetermined period of time, may determine that the input operation is the second input operation, the operation signal transmission unit may wirelessly transmit a first operation signal in the case of the first input operation, and may wirelessly transmit a second operation signal in the case of the second input operation, and the frequency switching determination unit may determine whether to switch the transmission frequency band each time the user completes the input operation, and, when the previously accepted input operation is the second input operation and a currently accepted input operation is the first input operation, may determine not to switch the transmission frequency band after the user completes the current first input operation.

With the above configuration, when communication of a currently transmitted first operation signal is successfully carried out, and, for example, when a so-called short press input operation (second input operation) is accepted and then a second operation signal is transmitted subsequently, the second operation signal is transmitted in the same transmission frequency band as that of the first operation signal, so communication of the second operation signal may be successfully carried out at a high probability. That is, when a short press input operation is carried out after a long press input operation, the success rate of communication through the short press input operation may be improved.

In the above configuration, the receiver may be equipped for a vehicle, the control target may include a door closing device that closes a door of the vehicle and a locking device that locks the door, and the control unit may execute, control for activating the door closing device to close the door when the operation signal reception unit has received the first operation signal, and may execute control for activating the locking device to lock the door when the operation signal reception unit has received the second operation signal.

With the above configuration, when control for closing the door corresponds to a long press input operation and control for locking the door corresponds to a short press input operation, a series of controls for locking the door after the door is closed may be successfully executed at a high probability.

In the first aspect, the mobile device may further include an initial input determination unit that determines an input operation, which is accepted after a predetermined initialization time has elapsed from when the input operation is previously accepted, as an initial input operation; wherein the frequency switching determination unit, when a predetermined condition is satisfied, may determine not to switch the transmission frequency band until the initialization time elapses from when the initial input operation is accepted, and may determine to switch the transmission frequency band when the initialization time has elapsed from when the initial input operation is accepted.

With the above configuration, the transmission frequency band may be automatically switched after the initialization time has elapsed from when the initial input operation is accepted. Then, as long as a predetermined condition is satisfied, until the initialization time elapses from when the initial input operation is accepted, the transmission frequency band is not switched, and an operation signal may be wirelessly transmitted in the same frequency band as that of initial input. Thus, when communication of the initial operation signal is successfully carried out, communication of a subsequently transmitted operation signal may be successfully carried out at a high probability.

In the above configuration, the mobile device may further include a successive input determination unit that determines an input operation, which is accepted by the time the initialization time elapses from when the initial input operation is accepted, as a successive input operation; and an input counting unit that counts the number of inputs of a successive input operation accepted by the time the initialization time elapses from when the initial input operation is accepted, wherein the frequency switching determination unit, when the counted number of inputs is smaller than a predetermined threshold by the time the initialization time elapses from when the initial input operation is accepted, may determine not to switch the transmission frequency band, and, when the counted number of inputs is larger than or equal to the threshold, may determine to switch the transmission frequency band at that time.

With the above configuration, when the number of inputs of a successive input operation is smaller than the predetermined threshold, the frequency band is not switched until the initialization time elapses from when initial input is accepted. That is, an operation signal transmitted in correspondence with a successive input operation that is input during the initialization time (hereinafter, referred to as successive operation signal) is transmitted in the same transmission frequency band as that of an operation signal transmitted in correspondence with an initial input operation (hereinafter, referred to as initial operation signal). When communication of an initial operation signal is successfully carried out, it is presumably less likely that communication of an operation signal in the frequency band in which the communication has been successfully carried out is interfered, so, by transmitting a successive operation signal in that frequency band, communication of the successive operation signal may also be successfully carried out at a high probability.

In addition, with the above configuration, for example, when wireless communication in the transmission frequency band at the time of initial input is interfered, the user successively carries out an input operation a predetermined number of times or above to thereby make it possible to intentionally change the transmission frequency band.

In the above configuration, the receiver may further include a reception frequency switching unit that sequentially switches a reception frequency band, which is a frequency band of the operation signal received by the operation signal reception unit, among the plurality of frequency bands each time a predetermined period of time elapses; and a reception frequency band switching interruption unit that, when the operation signal has been received, interrupts switching of the reception frequency band until at least the initialization time elapses from when the operation signal has been received.

With the above configuration, the reception frequency band is switched every constant period of time, so it is not necessary to provide a plurality of antennas in correspondence with frequency bands in which the mobile device may possibly transmit an operation signal. That is, it is possible to receive operation signals in respective frequency bands at low cost. In addition, until the initialization time elapses from when an initial operation signal is received, the reception frequency band is maintained in the same frequency band as that at the time when the initial operation signal is received, so it is possible to further reliably receive an operation signal that is transmitted subsequent to the initial operation signal in that frequency band.

In the above configuration, the mobile device may further include a successive input determination unit that determines an input operation, which is accepted by the time the initialization time elapses from when the initial input operation is accepted, as a successive input operation, wherein the operation signal transmission unit, when the initial input operation is accepted, may wirelessly transmit an initial operation signal, and, when the successive input operation is accepted, may wirelessly transmit a successive operation signal, the receiver may be equipped for a vehicle, the control target may be a locking device that places a door of the vehicle in any one of a first locking state where the door is not openable from outside the vehicle and is openable from inside the vehicle and a second locking state where the door is not openable from both outside and inside the vehicle, and the control unit may execute control for activating the locking device to place the door in the first locking state when the operation signal reception unit has received the initial operation signal, and may execute control for activating the locking device to place the door in the second locking state when the operation signal reception unit has received the successive operation signal.

With the above configuration, after successfully executing control through initial input for placing the door in a state where it is not openable only from outside the vehicle and is openable from inside the vehicle, control through successive input for placing the door in a locking state where the door of the vehicle is not openable from both outside and inside the vehicle (so-called double lock state) may be successfully executed at a high probability.

In the first aspect, the receiver may further include an establishment notification unit that, when the operation signal has been received, transmits a communication establishment signal that indicates that communication of the operation signal is established, and the mobile device may further include an establishment signal reception unit that receives the communication establishment signal, wherein the frequency switching determination unit, when the communication establishment signal is received by the time a predetermined stand-by time elapses from when the operation signal is transmitted, may determine not to switch the transmission frequency band, and, when the communication establishment signal is not received by the time the predetermined stand-by time elapses from when the operation signal is transmitted, may determine to switch the transmission frequency band when the stand-by time has elapsed.

With the above configuration, when communication of an operation signal is successfully carried out, the transmission frequency band is not switched, so a subsequently transmitted operation signal is also transmitted in the same frequency band as that of the previously transmitted operation signal. When communication of an operation signal is successfully carried out, it is presumably less likely that communication in the frequency band in which the communication has been successfully carried out is interfered, so communication of an operation signal transmitted subsequently may also be successfully carried out at a high probability.

In the first aspect, the mobile device may further include an initial input determination unit that determines an input operation, which is accepted after a predetermined initialization time has elapsed from when the input operation is previously accepted, as an initial input operation; and a successive input determination unit that determines an input operation, which is accepted by the time the initialization time elapses from when the initial input operation is accepted, as a successive input operation, wherein the frequency switching determination unit may determine whether to switch the transmission frequency band each time the user completes the input operation, wherein the frequency switching determination unit may determine not to switch the transmission frequency band when the initial input operation is accepted, and may determine to switch the transmission frequency band when the successive input operation is accepted.

With the above configuration, for a second input operation accepted subsequent to an initial input operation, an operation signal is wirelessly transmitted in the same transmission frequency band as that of an initial operation signal transmitted at the time of the initial input operation. When communication of the initial operation signal is successfully carried out, it is presumably less likely that communication in the frequency band in which the communication has been successfully carried out is interfered, so communication of the operation signal transmitted through the second input operation may also be successfully carried out at a high probability. In addition, the transmission frequency band is switched immediately after the second input operation, so, even when communication is not successfully carried out through an initial input operation and a second input operation, the user is able to transmit an operation signal in the switched frequency band through a third input operation without carrying out an operation for switching the transmission frequency band.

A second aspect of the invention provides a mobile device. The mobile device includes: an input unit that accepts user's input operation; an operation signal transmission unit that wirelessly transmits an operation signal corresponding to the input operation while the input operation is being carried out; a frequency switching determination unit that determines whether to switch a transmission frequency band for transmitting the operation signal among a plurality of frequency bands, wherein the frequency switching determination unit determines whether to switch the transmission frequency band from a first frequency band to a second frequency band on the basis of at least any one of a manner of the input operation and a state of wireless communication; and a transmission frequency switching unit that switches the transmission frequency band when the frequency switching determination unit determines to switch the transmission frequency band.

With the mobile device according to the second aspect of the invention, the mobile device has part of functions of the above described remote control system to thereby make it possible to obtain similar advantageous effects.

BRIEF DESCRIPTION OF THE DRAWINGS

The foregoing and further objects, features and advantages of the invention grill become apparent from the following description of example embodiments with reference to the accompanying drawings, wherein like numerals are used to represent like elements and wherein.

DETAILED DESCRIPTION OF EMBODIMENTS

First Embodiment

Hereinafter, a remote control system 100 according to a first embodiment of the invention will be described. First, the configuration of the remote control system 100 will be described with reference to FIG. 1. Note that FIG. 1 is an example of a block diagram that shows the configuration of the remote control system 100.

Figure 1:
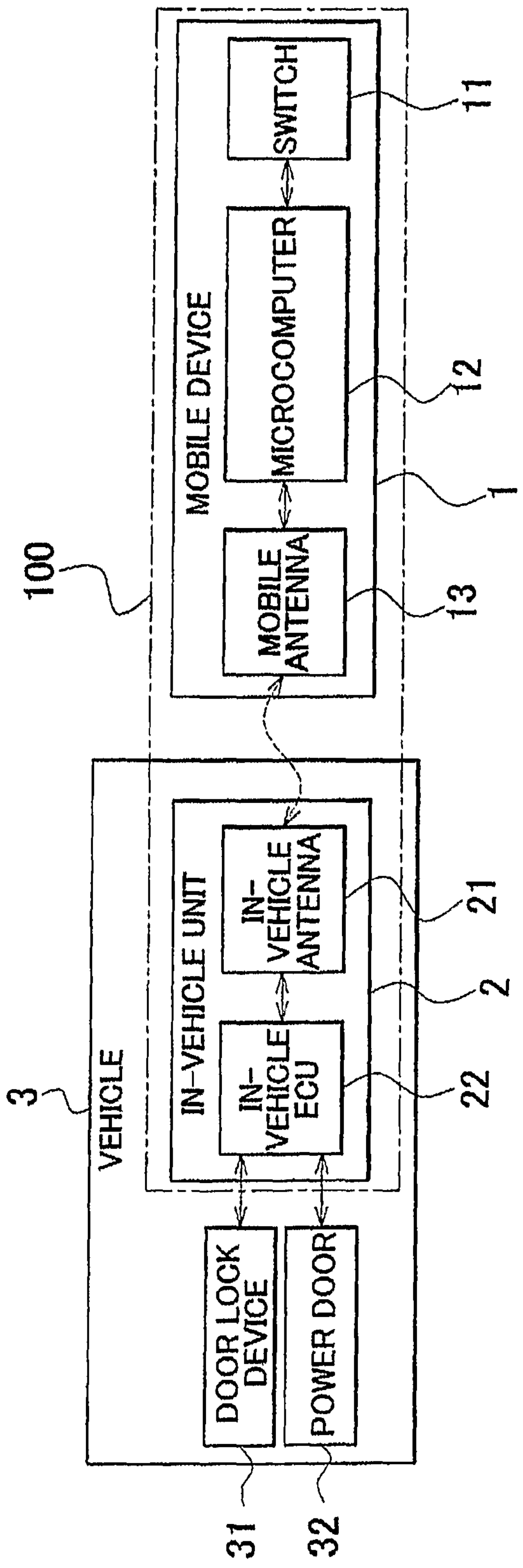
FIG. 1 is an example of a block diagram that shows the configuration of a remote control system.

As shown in FIG. 1, the remote control system 100 includes a mobile device 1 and an in-vehicle unit 2. The mobile device 1 and the in-vehicle unit 2 carry out wireless communication with each other. The in-vehicle unit 2 is equipped for a vehicle 3. In addition, the vehicle 3 is equipped with a door lock device 31 that is controlled by the in-vehicle unit 2.

The mobile device 1 is a terminal device that can be carried by a user, and is a so-called electronic key for operating an in-vehicle device, such as the door lock device 31, equipped for the vehicle 3. The mobile device 1 includes a switch 11, a microcomputer 12 and a mobile antenna 13.

The switch 11 is, for example, a press-down switch. The switch 11 is in an on state while it is being depressed by the user, and is in an off state while it is not depressed. The switch 11 outputs a switch input signal to the microcomputer 12 while the switch 11 is being depressed by the user. The switch input signal indicates that the switch 11 is in an on state.

The microcomputer 12 is a control device that, for example, includes an information processing unit, such as a central processing unit (CPU), a storage unit, such as a memory, and an interface circuit. The microcomputer 12 wirelessly transmits an operation signal via the mobile antenna 13. The operation signal indicates user's input operation to the switch 11. Note that the operation signal is formed of a plurality of bit strings. The details of a process executed by the microcomputer 12 will be described later with reference to FIG. 2.

The mobile antenna 13 is an antenna device that wirelessly transmits the operation signal in response to a command of the microcomputer 12. The mobile antenna 13 is able to transmit the operation signal in any one of a frequency band F1 and a frequency band F2 different from the frequency band F1. Although the details will be described later, the microcomputer 12 sets any one of the frequency band F1 and the frequency band F2 as a transmission frequency band. Then, the mobile antenna 13 wirelessly transmits the operation signal in a set transmission frequency band in response to a command of the microcomputer 12.

The in-vehicle unit 2 is a control device that is equipped for the vehicle 3 and that controls an in-vehicle device, such as the door lock device 31, in response to user's operation of the mobile device 1. The in-vehicle unit 2 includes an in-vehicle antenna 21 and an in-vehicle ECU 22. In addition, the vehicle 3 is further equipped with the door lock device 31 and a power door 32.

The in-vehicle antenna 21 is an antenna device that is able to receive a wireless signal in the frequency band F1 and a wireless signal in the frequency band F2. The in-vehicle antenna 21 receives and decodes a wireless signal, such as the operation signal, transmitted from the mobile antenna 13 of the mobile device 1, and transmits data indicated by the signal to the in-vehicle ECU 22.

The in-vehicle ECU 22 is a control device that, for example, includes an information processing unit, such as a CPU, a storage unit, such as a memory, and an interface circuit. The in-vehicle ECU 22 outputs a control signal to the in-vehicle device, such as the door lock device 31 and the power door 32, on the basis of a received operation signal via the in-vehicle antenna 21. The control signal is used to activate the in-vehicle device.

The in-vehicle ECU 22 executes control for switching a frequency band that the in-vehicle antenna 21 is able to receive (hereinafter, referred to as reception frequency band) to any one of the frequency band F1 and the frequency band F2 each time a predetermined period of time elapses. Note that, when the in-vehicle antenna 21 is configured to be able to receive a wireless signal in the frequency band F1 and a wireless signal in the frequency band F2 at the same time, the in-vehicle ECU 22 does not need to execute process for switching the above described reception frequency band.

The door lock device 31 is an electronic door locking device equipped for the vehicle 3. The door lock device 31 locks or unlocks a door provided for the vehicle 3 in accordance with a control signal input from the in-vehicle ECU 22.

The power door 32 is a drive device that electrically opens or closes the door of the vehicle 3. The power door 32 opens or closes the door of the vehicle 3 in accordance with a control signal input from the in-vehicle ECU 22.

Figure 2:
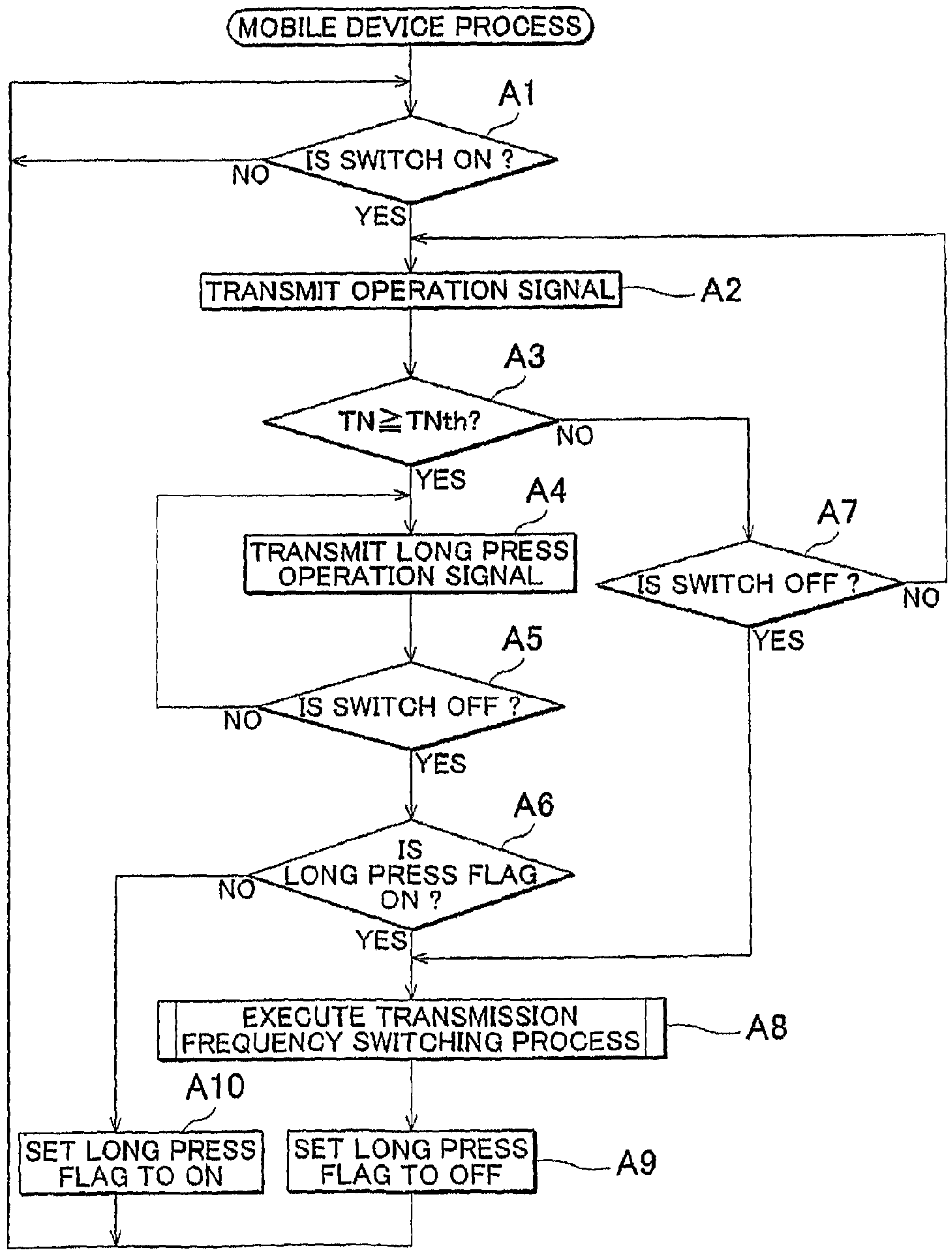
FIG. 2 is an example of a flowchart that shows a mobile device process executed by a microcomputer according to a first embodiment.

Next, a process executed by the microcomputer 12 (hereinafter, referred to as mobile device process) will be described with reference to FIG. 2. FIG. 2 is an example of a flowchart that shows the mobile device process executed by the microcomputer 12 according to the first embodiment. The microcomputer 12 executes the mobile device process shown in FIG. 2 while the microcomputer 12 is being supplied with electric power from a battery (not shown) mounted on the mobile device 1. As the microcomputer 12 starts the process shown in FIG. 2, the microcomputer 12 initially executes the process of step A1.

In step A1, the microcomputer 12 determines whether the switch 11 is on. That is, the microcomputer 12 determines whether the switch 11 is depressed by the user. Specifically, the microcomputer 12 determines whether an input signal has been received from the switch 11. When the microcomputer 12 determines that the switch 11 is on, the microcomputer 12 proceeds with the process to step A2. On the other hand, when the microcomputer 12 determines that the switch 11 is off, the microcomputer 12 returns the process to step A1.

In step A2, the microcomputer 12 transmits an operation signal. Specifically, the microcomputer 12 outputs, to the mobile antenna 13, a command signal for wirelessly transmitting the operation signal in the set transmission frequency band. When the process of step A2 is complete, the microcomputer 12 proceeds with the process to step A3.

In step A3, the microcomputer 12 determines whether a long press determination time TNth has elapsed. The long press determination time TNth is a period of time used for determining whether user's input operation is a long press input operation or a short press input operation. Hereinafter, an input operation in which the user continues depressing the switch 11 for a period of time longer than or equal to the long press determination time TNth and then releases the switch 11 is termed long press input operation. In addition, an input operation in which the user depresses the switch 11 for a period of time shorter than the long press determination time TNth and then releases the switch 11 is termed short press input operation. The microcomputer 12 measures a duration TN during which the switch 11 is in an on state from when the switch 11 enters the on state in step A1. Then, the microcomputer 12 determines whether the duration TN is longer than or equal to the long press determination time TNth. When the microcomputer 12 determines that the long press determination time TNth has elapsed, the microcomputer 12 proceeds with the process to step A4. On the other hand, when the microcomputer 12 determines that the long press determination time TNth has not elapsed yet, the microcomputer 12 proceeds with the process to step A7.

In step A4, the microcomputer 12 transmits a long press operation signal. Specifically, the microcomputer 12 transmits a signal that is obtained by adding a long press bit to an operation signal. The long press bit is a bit that indicates that the long press input operation has been carried out. Hereinafter, an operation signal to which a long press bit is added is termed a long press operation signal. In addition, in order to be distinguished from the long press operation signal, an operation signal, to which no long press bit is added and which is transmitted through the process of step A2, is termed short press operation signal. When the process of step A4 is complete, the microcomputer 12 proceeds with the process to step A5.

In step A5, the microcomputer 12 determines whether the switch 11 is off. That is, the microcomputer 12 determines whether the user has completed depression of the switch 11. Specifically, the microcomputer 12 determines whether an input signal is being received from the switch 11. When the microcomputer 12 determines that no input signal is being received from the switch 11 and the switch 11 is off, the microcomputer 12 proceeds with the process to step A6. On the other hand, when the microcomputer 12 determines that an input signal has been received from the switch 11 and the switch 11 is on, the microcomputer 12 returns the process to step A4.

Through the processes from step A3 to step A5, when the user continues depressing the switch 11 for a period of time longer than or equal to the long press determination time TNth, a long press operation signal is wirelessly transmitted while the user is depressing the switch 11.

In step A6, the microcomputer 12 determines whether a long press flag is on. The long press flag is a flag that indicates that a previously accepted input operation was the long press input operation when the long press flag is on. The microcomputer 12 loads the status of the long press flag stored in the storage unit to determine whether the status of the flag is on. When the microcomputer 12 determines that the long press flag is on, the microcomputer 12 proceeds with the process to step A8 and switches the transmission frequency band. On the other hand, when the microcomputer 12 determines that the long press flag is off, the microcomputer 12 proceeds with the process to step A10 and does not switch the transmission frequency band.

In step A7, as in the case of step A5, the microcomputer 12 determines whether the switch 11 is off. When the microcomputer 12 determines that the switch 11 is off, the microcomputer 12 proceeds with the process to step A8. On the other hand, when the microcomputer 12 determines that the switch 11 is on, the microcomputer 12 returns the process to step A2 and continues transmitting the operation signal.

With the process of step A7, when the duration during which the switch 11 is being depressed is shorter than the long press determination time TNth, the short press operation signal is continuously transmitted. In addition, when the user releases the switch 11 in the duration shorter than the long press determination time TNth, that is, when the short press input operation is carried out, the microcomputer 12 proceeds with the process to step A8 and switches the transmission frequency band.

Figure 3:
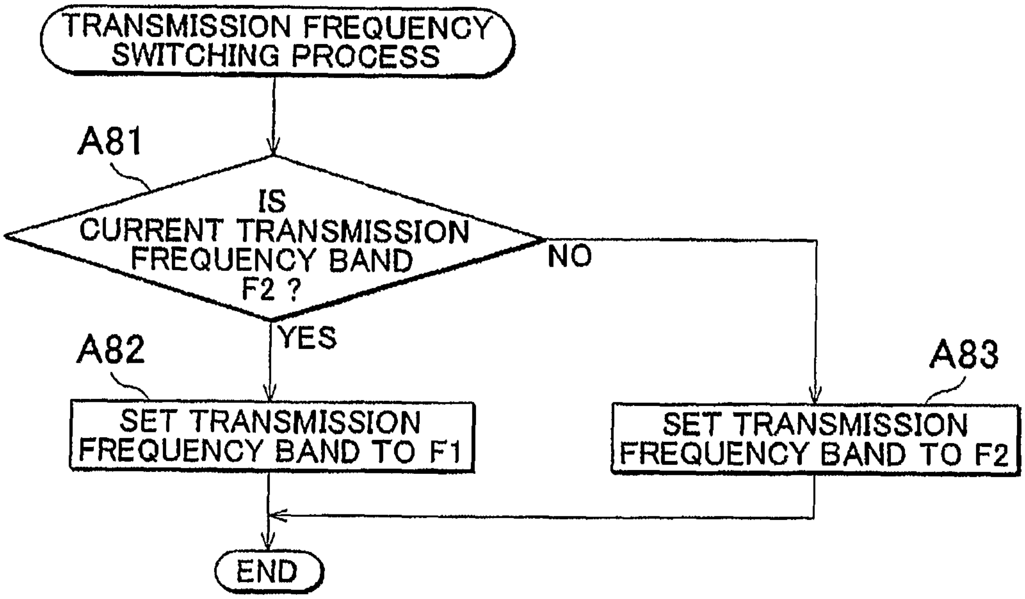
FIG. 3 is an example of a flowchart that shows a transmission frequency switching process.

In step A8, the microcomputer 12 executes transmission frequency switching process. The transmission frequency switching process is a process for switching the transmission frequency band into a frequency band different from a currently set frequency band. Hereinafter, the transmission frequency switching process will be described with reference to FIG. 3. Note that FIG. 3 is an example of a flowchart that shows the transmission frequency switching process. As the microcomputer 12 starts the transmission frequency switching process, the microcomputer 12 initially executes the process of step A81.

In step A81, the microcomputer 12 determines whether the current transmission frequency band is the frequency band F2. Specifically, the microcomputer 12 loads the set transmission frequency band stored in the storage unit and determines whether the transmission frequency band is set to the frequency band F2. When the microcomputer 12 determines that the frequency band F2 is currently set as the transmission frequency band, the microcomputer 12 proceeds with the process to step A82. On the other hand, when the microcomputer 12 determines that the currently set transmission frequency band is not the frequency band F2, that is, the currently set transmission frequency band is the frequency band F1, the microcomputer 12 proceeds with the process to step A83.

In step A82, the microcomputer 12 changes the transmission frequency band to the frequency band F1. Specifically, the microcomputer 12 transmits, to the mobile antenna 13, a command signal for setting the transmission frequency band to the frequency band F1. In addition, the microcomputer 12 overwrites and stores the frequency band F1 as the set transmission frequency band in the storage unit. When the process of step A82 is complete, the microcomputer 12 proceeds with the process to step A9 of the flowchart shown in FIG. 2.

In step A83, the microcomputer 12 changes the transmission frequency band to the frequency band F2. Specifically, the microcomputer 12 transmits, to the mobile antenna 13, a command signal for changing the transmission frequency band to the frequency band F2. In addition, the microcomputer 12 overwrites and stores the frequency band F2 as the set transmission frequency band in the storage unit. When the process of step A83 is complete, the microcomputer 12 proceeds with the process to step A9 of the flowchart shown in FIG. 2.

With the transmission frequency switching process, when the frequency band F1 is set as the transmission frequency band, the transmission frequency band is changed to the frequency band F2. In addition, when the frequency band F2 is set as the transmission frequency band, the transmission frequency band is changed to the frequency band F1.

Through the processes of step A7 and step A8, when the accepted input operation is the short press input operation, the transmission frequency switching process is executed to change the transmission frequency.

In step A9, the microcomputer 12 sets the long press flag to off. Specifically, the microcomputer 12 sets the status of the long press flag stored in the storage unit to off and then overwrites and stores the long press flag in the storage unit. When the process of step A9 is complete, the microcomputer 12 returns the process to step A1.

In step A10, the microcomputer 12 sets the long press flag to on. Specifically, the microcomputer 12 sets the status of the long press flag stored in the storage unit to on and then overwrites and stores the long press flag in the storage unit. When the process of step A10 is complete, the microcomputer 12 returns the process to step A1.

Through the processes of step A6 to step A10, when the currently accepted input operation is the long press input operation and the previously accepted input operation was also the long press input operation, that is, when the long press input operation is successively carried out, the transmission frequency band is switched. On the other hand, when the currently accepted input operation is the long press input operation and the previously accepted input operation was the short press input operation, the transmission frequency band is not changed.

Figures 4A, 4B:
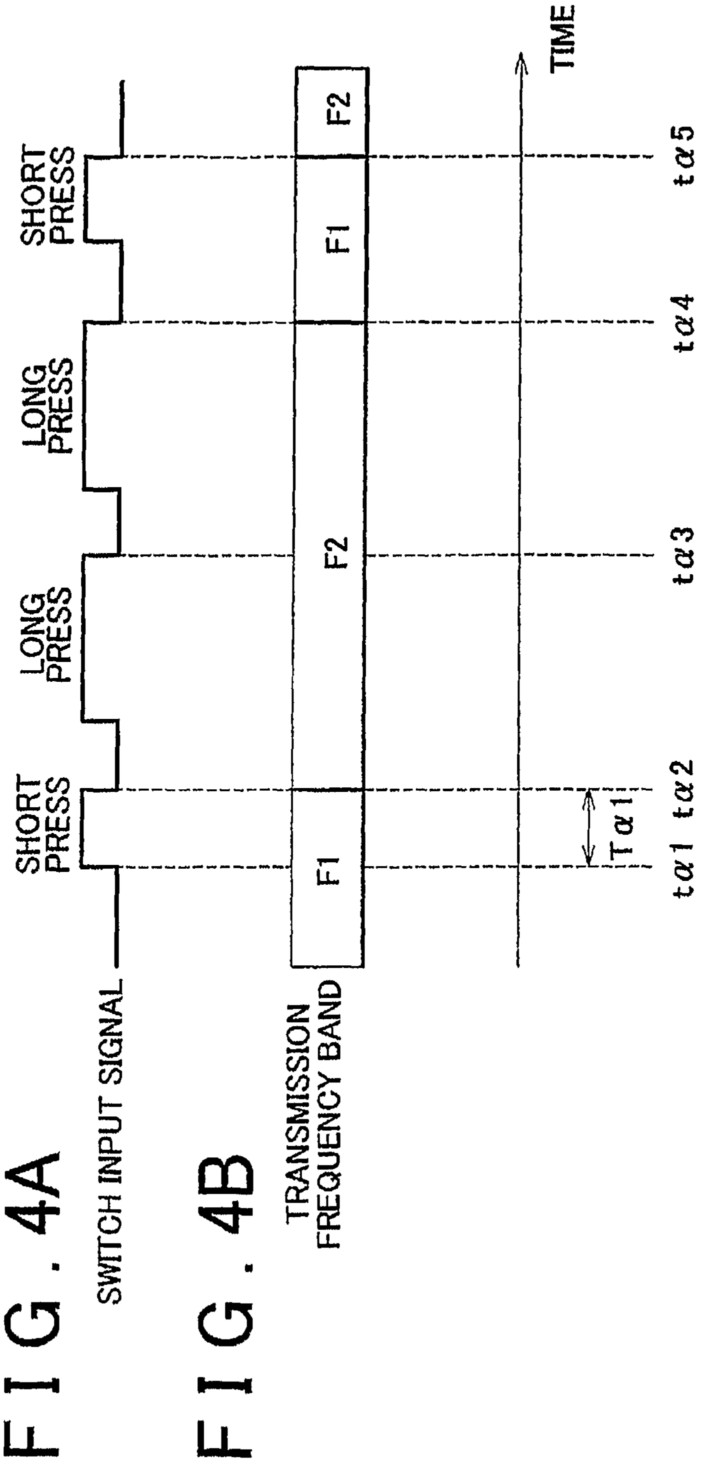
FIGS. 4A and 4B are examples of timing charts that show a state where the microcomputer according to the first embodiment switches a set transmission frequency band in response to user's input operation.

Next, a state where the microcomputer 12 according to the first embodiment switches the transmission frequency band on the basis of the mobile device process and user's input operation will be described with reference to FIGS. 4A and 4B. FIGS. 4A and 413 are examples of a timing charts that show a state where the microcomputer 12 according to the first embodiment switches the transmission frequency band. In FIGS. 4A and 4B, the abscissa axis represents time. In FIG. 4A, Switch Input Signal indicates a switch input signal output from the switch 11 at each instant of time. In FIG. 4B, Transmission Frequency Band indicates a frequency band set as the transmission frequency band at each instant of time.

In FIG. 4A, the user carries out an input operation to the switch 11 from time $t\alpha1$ to time $t\alpha2$. A period of time $T\alpha1$ from time $t\alpha1$ to time $t\alpha2$ is shorter than the long press determination time TNth. Thus, at time $t\alpha2$, the microcomputer 12 determines the input operation carried out from time $t\alpha1$ to time $t\alpha2$ as the short press input operation (from step A1 to step A7). Then, after the microcomputer 12 completes transmission of the short press operation signal, the microcomputer 12 changes the transmission frequency band from the frequency band F1 to the frequency band F2 (step A7 and step A8).

After time $t\alpha2$, the user completes the long press input operation at time $t\alpha3$ and at time $t\alpha4$ in time sequence, and completes the short press input operation at time $t\alpha5$.

At time $t\alpha3$, because the currently accepted input operation is the long press input operation and the previously accepted input operation is the short press input operation, the microcomputer 12 maintains the transmission frequency band in the frequency band F2 (from step A3 to step A6 and step A10).

As described above, when the user carries out the short press input operation and then carries out the long press input operation, the transmission frequency band is not changed after the long press input operation. Thus, the success rate of communication of the long press operation signal and the operation signal may be improved.

For example, when the long press input operation corresponds to control for closing the power door 32 and the short press input operation corresponds to control for causing the door lock device 31 to lock the door, and when the user closes the power door 32 and then causes the door lock device 31 to lock the door, the user carries out a series of operations, that is, the user initially carries out the long press input operation and subsequently carries out the short press input operation. Here, a situation that noise, or the like, around the vehicle interferes with wireless communication of the frequency band F2 is assumed. Under the above situation, if a long press operation signal is initially transmitted in the frequency band F1 through the long press input operation and then the transmission frequency band is switched to the frequency band F2, there is a possibility that a short press operation signal through a subsequently carried out short press input operation is interfered and, as a result, the short press operation signal cannot be normally received by the in-vehicle unit 2. That is, there is a possibility that the in-vehicle ECU 22 cannot execute control for causing the door lock device 31 to lock the door after closing the power door 32. However, with the mobile device process of the microcomputer 12, the transmission frequency band is not changed after the long press input operation subsequent to the short press input operation. Therefore, for example, after a long press operation signal is transmitted in the frequency band F1 through the long press input operation, a short press operation signal may be subsequently transmitted in the same frequency band F1. Thus, after the in-vehicle ECU 22 receives the long press operation signal, the in-vehicle ECU 22 normally receives the short press operation signal without interference, and is able to execute control for causing the door lock device 31 to lock the door after closing the power door 32.

Referring back to FIGS. 4A and 4B, at time $t\alpha4$, because the currently accepted input operation is the long press input operation and the previously accepted input operation is also the long press input operation, the microcomputer 12 switches the transmission frequency band from the frequency band F2 to the frequency band F1 (from step A3 to step A6 and step A8).

As described above, when the long press input operation is carried out successively by the user, the transmission frequency band is changed. Therefore, for example, when, under a situation that wireless communication in the frequency band F1 set as the transmission frequency band is interfered, the user repeats the same long press input operation without recognizing the interference, the transmission frequency band is automatically switched to the frequency band F2, so the success rate of communication improves.

At time $t\alpha5$, because the currently accepted input operation is the short press input operation, the microcomputer 12 switches the transmission frequency band from the frequency band F1 to the frequency band F2.

As shown in FIGS. 4A and 4B, with the mobile device process of the microcomputer 12, except that a predetermined condition is satisfied, the transmission frequency band is automatically switched each time the user completes an input operation. Thus, even when the user does no operation for switching the transmission frequency band, the transmission frequency band is automatically switched in such a manner that the user just carries out an input operation for activating a control target. Therefore, the user is able to successfully carry out communication of the operation signal with the number of button operations smaller than that in the existing art.

With the remote control system 100 according to the first embodiment, it is determined whether the transmission frequency band is switched on the basis of the history of the input operations. Thus, the transmission frequency band is switched with a smaller number of operations to make it possible to improve the success rate of communication of the operation signal.

Note that, in the first embodiment, the in-vehicle ECU 22 executes control for closing the power door 32 in response to the long press operation signal, and executes control for causing the door lock device 31 to lock the door in response to the short press operation signal; however, the control target of the in-vehicle ECU 22 is not limited to the door lock device 31 and the power door 32. That is, the in-vehicle ECU 22 may control another in-vehicle device in response to a long press operation signal or a short press operation signal. For example, the in-vehicle ECU 22 may control an in-vehicle device, such as an electrically adjustable door mirror equipped for the vehicle 3, in response to a long press operation signal.

In addition, in the first embodiment, the microcomputer 12 classifies the type of an accepted input operation into the long press input operation and the short press input operation, and switches the transmission frequency band in accordance with the sequence of accepted input operations; however, as long as the transmission frequency band is switched on the basis of the manner of the input operation such as the type of an accepted input operation and the sequence of accepted input operations, the type of an input operation that the microcomputer 12 classifies is not limited to the long press input operation and the short press input operation. For example, when an input device that accepts an input operation is not a press-down switch, such as the switch 11, but a device, such as a touch panel, the microcomputer 12 may classify and accept an operation for tracing on the touch panel and an operation for pointing a point on the touch panel, and then switch the transmission frequency band in accordance with the sequence in which input operations are accepted.

Second Embodiment

In the first embodiment, the process in which the microcomputer 12 determines whether to switch the transmission frequency band each time the microcomputer 12 accepts an input operation and then immediately switches the transmission frequency band in accordance with the determination result is described. Instead, the microcomputer 12 may determine whether to switch the transmission frequency band and then switch the transmission frequency band in accordance with the determination result after a predetermined period of time has elapsed.

Note that the microcomputer 12 according to the first embodiment determines whether an accepted input operation is the long press input operation or the short press input operation; whereas the microcomputer 12 according to a second embodiment determines whether an accepted input operation is an initial input operation or a successive input operation. The initial input operation is an input operation in which the switch 11 is depressed once after a predetermined initialization time has elapsed from when the microcomputer 12 accepts a previous input operation. The successive input operation is an input operation in which the switch 11 is depressed again by the time the initialization time elapses from when the microcomputer 12 accepts the initial input operation.

Hereinafter, processes executed by the microcomputer 12 and the in-vehicle ECU 22 according to the second embodiment will be described. Note that the configuration of a remote control system according to the second embodiment is similar to the configuration of the remote control system 100 according to the first embodiment (see FIG. 1), so the description thereof is omitted.

Figure 5:
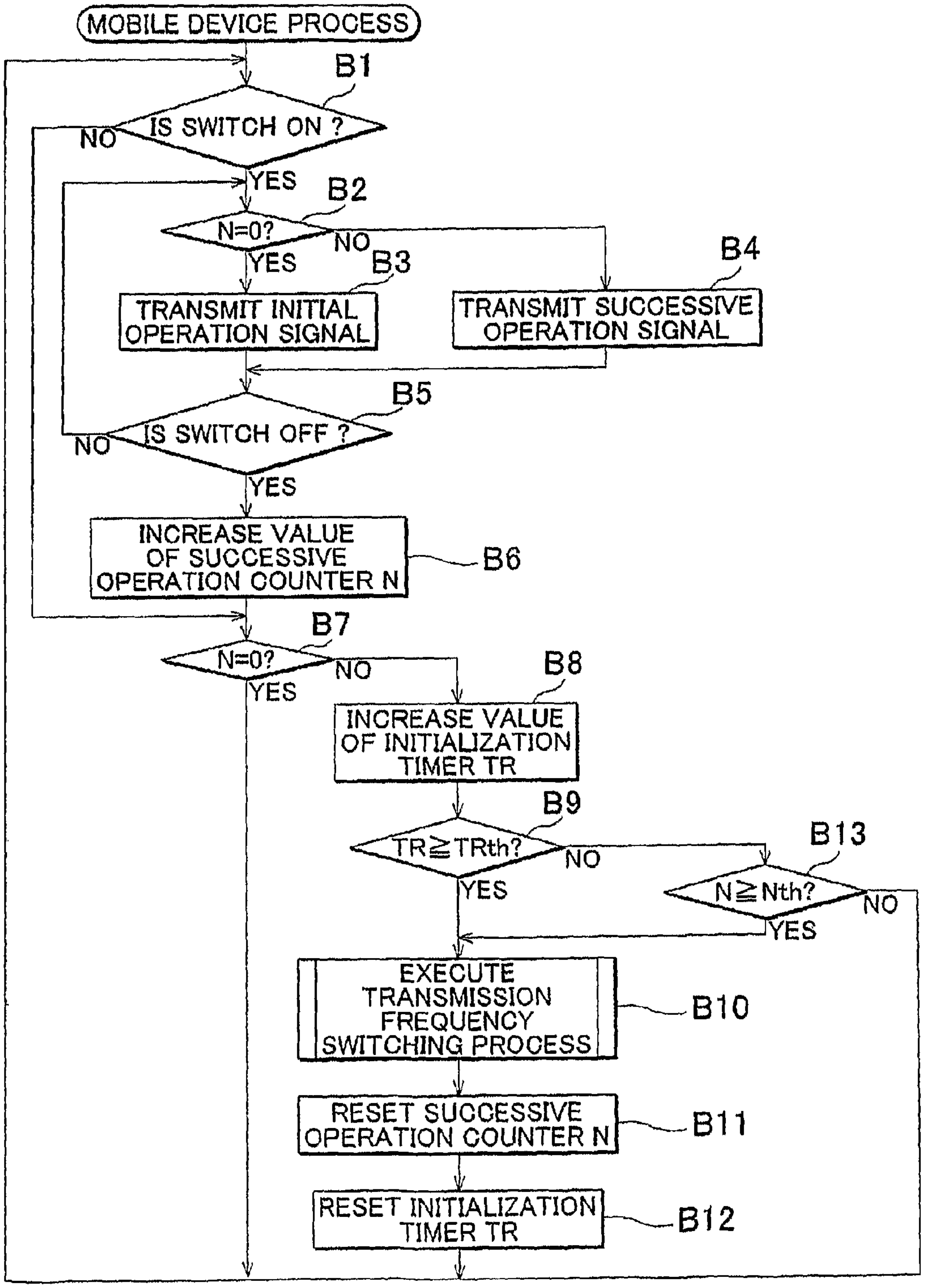
FIG. 5 is an example of a flowchart that shows a mobile device process executed by a microcomputer according to a second embodiment.

FIG. 5 is an example of a flowchart that shows a mobile device process executed by the microcomputer 12 according to the second embodiment. The microcomputer 12 executes the mobile device process shown in FIG. 5 while the microcomputer 12 is being supplied with electric power from a battery (not shown) mounted on the mobile device 1. As the microcomputer 12 starts the process shown in FIG. 5, the microcomputer 12 initially executes the process of step B1.

In step B1, the microcomputer 12 determines whether the switch 11 is on, as in the case of the above described step A1. When the microcomputer 12 determines that the switch 11 is on, the microcomputer 12 proceeds with the process to step B2. On the other hand, when the microcomputer 12 determines that the switch 11 is off; the microcomputer 12 proceeds with the process to step B7.

In step B2, the microcomputer 12 determines whether the value of a successive operation counter N is 0. The successive operation counter N is a nonnegative integer that indicates the number of input operations, which are accepted by the time the initialization time elapses, after an initial input operation, which is regarded as the first input operation, is accepted. The value of the successive operation counter N is stored in the storage unit of the microcomputer 12, and the initial value is set at 0. The microcomputer 12 loads the value of the successive operation counter N stored in the storage unit and determines whether the value of the counter N is 0. When the microcomputer 12 determines that the value of the successive operation counter N is 0, the microcomputer 12 proceeds with the process to step B3. On the other hand, when the microcomputer 12 determines that the value of the successive operation counter N is larger than 0, the microcomputer proceeds with the process to step B4.

In step B3, the microcomputer 12 transmits an initial operation signal. The initial operation signal is an operation signal that indicates that an accepted input operation is an initial input operation. The microcomputer 12 outputs, to the mobile antenna 13, a command signal for wirelessly transmitting the initial operation signal in the set transmission frequency band. When the process of step B3 is complete, the microcomputer 12 proceeds with the process to step B5.

In step B4, the microcomputer 12 transmits a successive operation signal. The successive operation signal is an operation signal that indicates that an accepted input operation is a successive input operation. The microcomputer 12 outputs, to the mobile antenna 13, a command signal for wirelessly transmitting the successive input operation signal in the set transmission frequency band. When the process of step B4 is complete, the microcomputer 12 proceeds with the process to step B5.

In step B5, the microcomputer 12 determines whether the switch 11 is off, as in the case of the process of step A5. When the microcomputer 12 determines that the switch 11 is off, the microcomputer 12 proceeds with the process to step B6. On the other hand, when the microcomputer 12 determines that the switch 11 is on, the microcomputer 12 returns the process to step B2.

Through the processes from step B1 to step B4, any one of the initial operation signal and the successive operation signal is wirelessly transmitted from the mobile antenna 13 in accordance with depression of the switch 11 by the user.

In step B6, the microcomputer 12 increases the value of the successive operation counter N. Specifically, the microcomputer 12 adds a predetermined constant, such as 1, to the successive operation counter N stored in the storage unit, and overwrites and stores the value resulting from the addition in the storage unit as the successive operation counter N. When the process of step B6 is complete, the microcomputer 12 proceeds with the process to step B7.

In step B7, the microcomputer 12 determines whether the value of the successive operation counter N is 0, as in the case of step B2. When the microcomputer 12 determines that the value of the successive operation counter N is 0, that is, when counting of an elapsed time is not started, the microcomputer 12 returns the process to step B1. On the other hand, when the microcomputer 12 determines that the value of the successive operation counter N is larger than 0, the microcomputer 12 proceeds with the process to step B8.

In step B8, the microcomputer 12 increases the value of an initialization timer TR. The initialization timer TR is a variable stored in the storage unit of the microcomputer 12 and is a variable that indicates an elapsed time from when the microcomputer 12 accepts an initial input operation. Note that the initial value of the initialization timer TR is, for example, 0. The microcomputer 12 adds a predetermined constant, such as 1, to the initialization timer TR stored in the storage unit, and overwrites and stores the value resulting from the addition in the storage unit as the initialization timer TR. When the process of step B8 is complete, the microcomputer 12 proceeds with the process to step B9.

In step B9, the microcomputer 12 determines whether the initialization timer TR is longer than or equal to an initialization time TRth. The initialization time TRth is a constant that is prestored in the storage unit of the microcomputer 12, and is a threshold that is used to determine whether a period of time during which a successive operation is accepted has elapsed from when an initial input operation is accepted. When the microcomputer 12 determines that the initialization tinier TR is longer than or equal to the initialization time TRth, that is, when the initialization time TRth has elapsed, the microcomputer 12 proceeds with the process to step B10. On the other hand, when the microcomputer 12 determines that the initialization timer TR is shorter than the initialization time TRth, that is, the initialization time TRth has not elapsed yet, the microcomputer 12 proceeds with the process to step B13.

In step B10, the microcomputer 12 executes transmission frequency switching process, as in the case of FIG. 3. That is, the microcomputer 12 changes the transmission frequency band to a frequency band different from the currently set frequency band. When the process of step B13 is complete, the microcomputer 12 proceeds with the process to step B11.

In step B11, the microcomputer 12 resets the successive operation counter N. Specifically, the microcomputer 12 sets the value of the successive operation counter N stored in the storage unit at the initial value 0 and then overwrites and stores the successive operation counter N. When the process of step B11 is complete, the microcomputer 12 proceeds with the process to step B12.

In step B12, the microcomputer 12 resets the initialization timer TR. Specifically, the microcomputer 12 sets the value of the initialization timer TR stored in the storage unit at the initial value, such as 0, and then overwrites and stores the initialization timer TR. When the process of step B12 is complete, the microcomputer 12 returns the process to step B1.

Through the processes from step B6 to step B9 and from step B11 to step B12, until the initialization time elapses, the microcomputer 12 increases the value of the successive operation counter N each time the microcomputer 12 accepts user's input operation.

In step B13, the microcomputer 12 determines whether the successive operation counter N is larger than or equal to a threshold Nth. The threshold Nth is a constant stored in the storage unit of the microcomputer 12 and is a threshold used to determine whether the transmission frequency band needs to be switched on the basis of the value of the successive operation counter N. When the microcomputer 12 determines that the successive operation counter N is larger than or equal to the threshold Nth, the microcomputer 12 proceeds with the process to step B10. On the other hand, when the microcomputer 12 determines that the successive operation counter N is smaller than the threshold Nth, the microcomputer 12 returns the process to step B1.

Through the process of step B13, for example, when the threshold Nth is 4, the transmission frequency band is switched when the number of input operations successively carried out within the initialization time, including an initial input operation, is four or above.

Figures 8A, 8B, 8C:
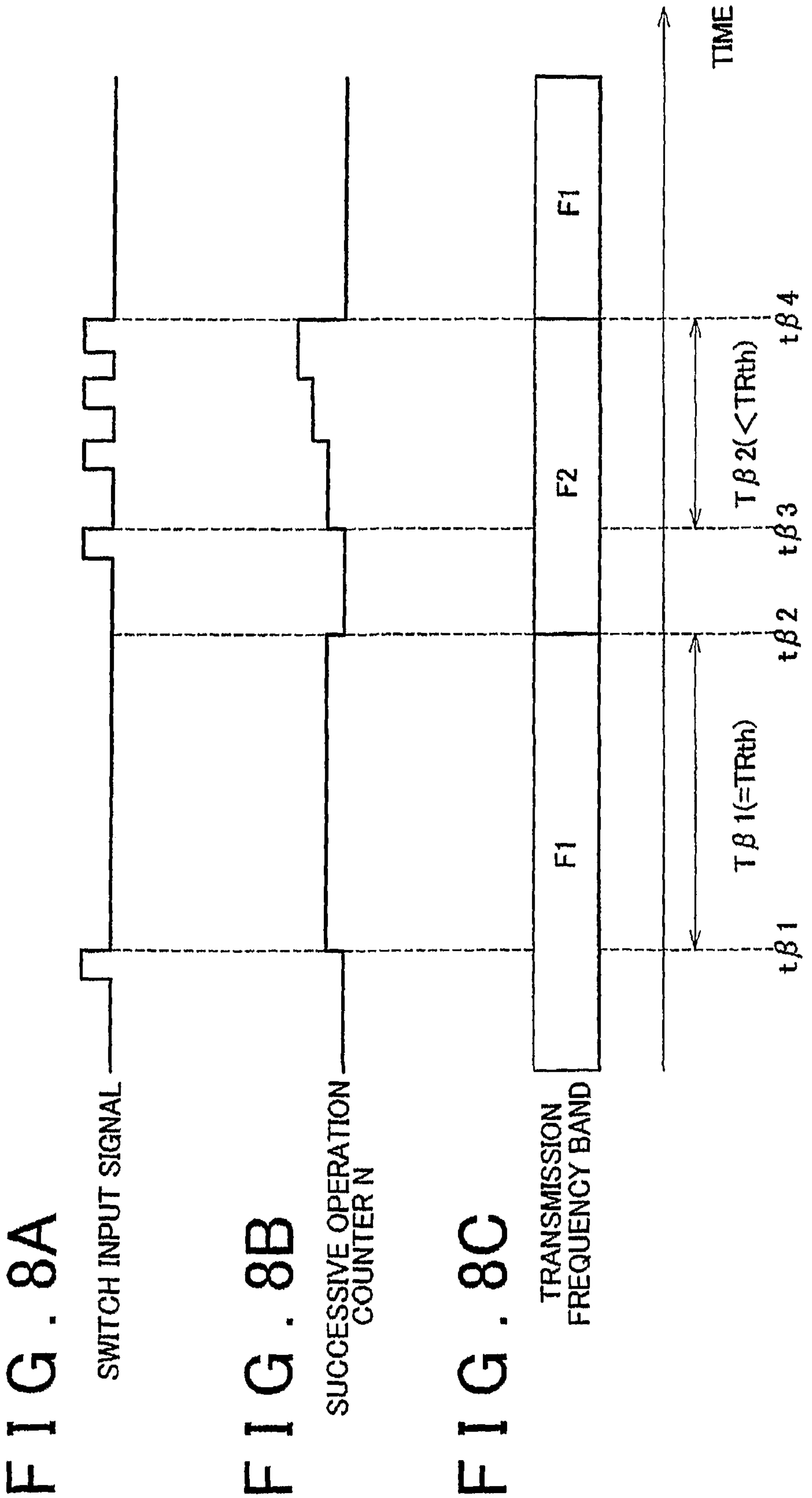
FIGS. 8A to 8C are examples of timing charts that show a state where the microcomputer according to the second embodiment switches a set transmission frequency band in response to user's input operation.

Next, a state where the microcomputer 12 according to the second embodiment switches the transmission frequency band in response to user's input operation will be described with reference to FIGS. 8A to 8C. FIGS. 8A to 8C are examples of timing charts that show a state where the microcomputer 12 according to the second embodiment switches the transmission frequency band. In FIGS. 8A to 8C, the abscissa axis represents time. In FIG. 8A, Switch Input Signal indicates a switch input signal output from the switch 11 at each instant of time. In FIG. 8B, Successive Counter N indicates the value of the successive operation counter N at each instant of time. In FIG. 8C, Transmission Frequency Band indicates a frequency band set as the transmission frequency band at each instant of time.

As shown in FIG. 8A, the user depresses the switch 11 as an input operation until time tβ1, and then a switch input signal is output to the microcomputer 12 in response to the input operation. Note that, at time tβ1, the transmission frequency band is set to the frequency band F1 as shown in FIG. 8C. Here, in FIG. 8B, the value of the successive operation counter N is 0 until time tβ1. The microcomputer 12 transmits an initial operation signal in the frequency band F1 on the basis of the switch input signal and the value of the successive operation counter N up to time tβ1 (from step B1 to step B3). Then, at time tβ1, the microcomputer 12 increases the value of the successive operation counter N (step B5 and step B6).

The microcomputer 12 increases the value of the initialization timer TR from time tβ1 (step B7 and step B8). Until time tβ2 at which the initialization timer TR reaches the initialization time TRth, that is, until the initialization time TRth elapses, there is no user's input operation to the switch 11. As shown in FIG. 8C, at time 132, the microcomputer 12 determines that the initialization time TRth has elapsed, and then switches the transmission frequency band from the frequency band F1 to the frequency band F2 (step B9 and step B10). In addition, as shown in FIG. 8B, the microcomputer 12 resets the value of the successive operation counter N at time tβ2 (step B11).

As described above, with the mobile device process of the microcomputer 12, the transmission frequency band is not switched unless the successive input operation is repeated a predetermined number of times or above by the time the initialization time elapses from the initial input operation. That is, when the number of times of the successive input operation does not exceed the predetermined number of times, the successive operation signal transmitted by the time the initialization time elapses is transmitted in the same transmission frequency band as that of the initial operation signal. Thus, when communication of the initial operation signal is successfully carried out, communication of the successive operation signal may also be successfully carried out at a high probability. In addition, the microcomputer 12 automatically switches the transmission frequency band when the initialization time elapses after the microcomputer 12 accepts the initial input operation, so the user does not need to carry out an operation for switching the transmission frequency band.

After time tβ2, at time tβ3, the microcomputer 12 accepts an initial input operation again. Furthermore, as shown in FIG. 8A, from time tβ3 to time tβ4, the microcomputer 12 accepts an input operation three times. A period of time Tβ2 from time tβ3 to time tβ4 does not reach the initialization time TRth, so the microcomputer 12 increases the value of the successive operation counter N each time the microcomputer 12 accepts an input operation, including an initial input operation, (from step B6 to step B9). Then, at time tβ4 at which the value of the successive operation counter N is larger than or equal to four, that is, the threshold Nth, the microcomputer 12 switches the transmission frequency band from the frequency band F2 to the frequency band F1 (step B13 and step B10).

As described above, with the microcomputer 12 according to the second embodiment, even before the initialization time elapses, when the user carries out a successive input operation the predetermined number of times or above, the transmission frequency band is switched. Thus, the user is able to switch the transmission frequency band at a selected timing. Note that, when it is not necessary for the user to switch the transmission frequency band, the process of step B13 may be omitted.

With the remote control system according to the second embodiment, it is determined whether the transmission frequency band is switched on the basis of the history of the input operations. Thus, as in the case of the remote control system 100 according to the first embodiment, the transmission frequency band is switched with a smaller number of operations to make it possible to improve the success rate of communication of an operation signal.

Note that the successive operation signal is transmitted in the same frequency band as that of the initial operation signal as described above, so, for example, when the in-vehicle ECU 22 is executing control process for sequentially switching the reception frequency band of the in-vehicle antenna 21 between the frequency band F1 and the frequency band F2 each time a predetermined period of time elapses, the in-vehicle ECU 22 desirably prohibits process for switching the reception frequency band until a predetermined period of time elapses from when the in-vehicle ECU 22 receives the initial operation signal. By maintaining the reception frequency band in the same frequency band as that at the time when the in-vehicle ECU 22 receives the initial operation signal, the in-vehicle ECU 22 is able to receive a successive operation signal transmitted subsequent to the initial operation signal at a high probability.

Figure 6:
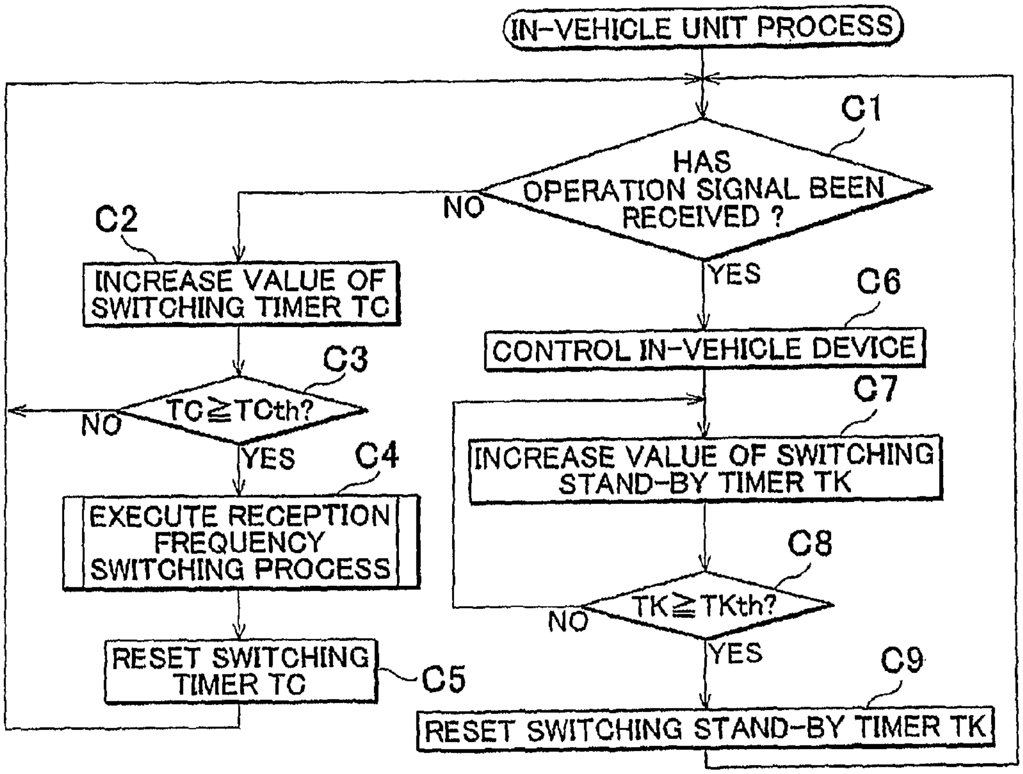
FIG. 6 is an example of a flowchart that shows an in-vehicle unit process executed by an in-vehicle ECU according to the second embodiment.

Hereinafter, a process executed by the in-vehicle ECU 22 according to the second embodiment (hereinafter, referred to as in-vehicle unit process) will be described with reference to FIG. 6, FIG. 6 is an example of a flowchart that shows the in-vehicle unit process executed by the in-vehicle ECU 22 according to the second embodiment. The in-vehicle ECU 22 executes the in-vehicle unit process shown in FIG. 6 while the in-vehicle ECU 22 is being supplied with electric power from a battery (not shown) mounted on the vehicle 3. As the in-vehicle ECU 22 starts the process shown in FIG. 6, the in-vehicle ECU 22 initially executes the process of step C1.

In step C1, the in-vehicle ECU 22 determines whether an operation signal has been received. Specifically, it is determined whether an initial operation signal or a successive operation signal has been received via the in-vehicle antenna 21. When the in-vehicle ECU 22 determines that an operation signal has been received, the in-vehicle ECU 22 proceeds with the process to step C6. On the other hand, when the in-vehicle ECU 22 determines that no operation signal is received, the in-vehicle ECU 22 proceeds with the process to step C2.

Through the process of step C2, the processes from step C2 to step C5 are repeatedly executed in a period during which no operation signal is received, and the reception frequency band is switched each time a switching time elapses. On the other hand, when an operation signal has been received, the processes from step C6 to step C9, which will be described later, are executed to prohibit switching of the reception frequency band until a reception stand-by time elapses.

In step C2, the in-vehicle ECU 22 increases the value of a switching timer TC. The switching timer TC is a variable stored in the storage unit of the in-vehicle ECU 22 and is a value that indicate an elapsed time from when the reception frequency band is switched. Note that the initial value of the switching tinier TC is 0. The in-vehicle ECU 22 adds a predetermined constant, such as 1, to the switching timer TC stored in the storage unit, and overwrites and stores the value resulting from the addition in the storage unit as the switching timer TC. When the process of step C2 is complete, the in-vehicle ECU 22 proceeds with the process to step C3.

In step C3, the in-vehicle ECU 22 determines whether the switching timer TC is longer than or equal to a switching time TCth. The switching time TCth is a constant stored in the storage unit of the in-vehicle ECU 22 and is a threshold used to determine a timing at which the reception frequency band is switched. The in-vehicle ECU 22 loads the values of the switching timer TC and switching time TCth stored in the storage unit, and determines whether the value of the switching timer TC is longer than or equal to the switching time TCth. When the in-vehicle ECU 22 determines that the switching timer TC is longer than or equal to the switching time TCth, the in-vehicle ECU 22 proceeds with the process to step C4 and then switches the reception frequency band. On the other hand, when the in-vehicle ECU 22 determines that the switching timer TC is shorter than the switching time TCth, the in-vehicle ECU 22 returns the process to step C1 without switching the reception frequency band.

Figure 7:
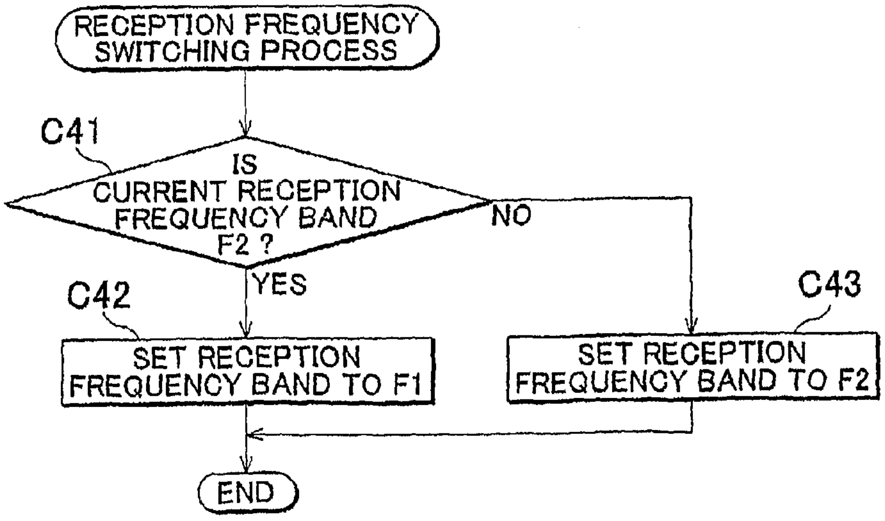
FIG. 7 is an example of a flowchart that shows a reception frequency switching process.

In step C4, the in-vehicle ECU 22 executes reception frequency switching process. The reception frequency switching process is a process for switching the reception frequency band into a frequency band different from a currently set frequency band. Hereinafter, the reception frequency switching process will be described with reference to FIG. 7. Note that FIG. 7 is an example of a flowchart that shows the reception frequency switching process. As the in-vehicle ECU 22 starts the reception frequency switching process, the in-vehicle ECU 22 initially executes the process of step C41.

In step C41, the in-vehicle ECU 22 determines whether the current reception frequency band is the frequency band F2. Specifically, the in-vehicle ECU 22 loads the set reception frequency band stored in the storage unit and determines whether the reception frequency band is set to the frequency band F2. When the in-vehicle ECU 22 determines that the frequency band F2 is currently set as the reception frequency band, the in-vehicle ECU 22 proceeds with the process to step C42. On the other hand, when the in-vehicle ECU 22 determines that the currently set reception frequency band is not the frequency band F2, that is, when the currently set reception frequency band is the frequency band F1, the in-vehicle ECU 22 proceeds with the process to step C43.

In step C42, the in-vehicle ECU 22 changes the reception frequency band to the frequency band F1. Specifically, the in-vehicle ECU 22 transmits, to the mobile antenna 13, a command signal for changing the reception frequency band to the frequency band F1. In addition, the in-vehicle ECU 22 overwrites and stores the frequency band F1 as the set reception frequency band. When the process of step C42 is complete, the in-vehicle ECU 22 proceeds with the process to step C5 of the flowchart shown in FIG. 6.

In step C43, the in-vehicle ECU 22 changes the reception frequency band to the frequency band F2. Specifically, the in-vehicle ECU 22 transmits, to the mobile antenna 13, a command signal for setting the reception frequency band to the frequency band F2. In addition, the in-vehicle ECU 22 overwrites and stores the frequency band F2 as the set reception frequency band. When the process of step C42 is complete, the in-vehicle ECU 22 proceeds with the process to step C5 of the flowchart shown in FIG. 6.

With the reception frequency switching process, when the frequency band F1 is set as the reception frequency band, the reception frequency band is changed to the frequency band F2. In addition, when the frequency band F2 is set as the reception frequency band, the reception frequency band is changed to the frequency band F1.

Referring back to FIG. 6, in step C5, the in-vehicle ECU 22 resets the switching timer TC. Specifically, the in-vehicle ECU 22 sets the switching timer TC at the initial value, and then overwrites and stores the switching timer TC in the storage unit. When the process of step C5 is complete, the in-vehicle ECU 22 returns the process to step C1.

Through the processes from step C2 to step C5, the reception frequency band is switched each time the switching time TCth elapses.

In step C6, the in-vehicle ECU 22 controls the in-vehicle device in accordance with the operation signal received in step C1. For example, when the in-vehicle ECU 22 has received an initial operation signal in step C1, the in-vehicle ECU 22 outputs, to the door lock device 31, a command for establishing a single lock state. In the single lock state, the door of the vehicle 3 is locked so that the door is not openable from outside the vehicle and the door is openable from inside the vehicle. In addition, when the in-vehicle ECU 22 has received a successive operation signal in step C1, the in-vehicle ECU 22 outputs, to the door lock device 31, a command for establishing a double lock state. In the double lock state, the door of the vehicle 3 is locked so that the door is not openable from both outside and inside the vehicle. When the process of step C6 is complete, the in-vehicle ECU 22 proceeds with the process to step C7.

In step C7, the in-vehicle ECU 22 increases the value of the switching stand-by timer TK. The switching stand-by timer TK is a variable stored in the storage unit of the in-vehicle ECU 22 and is a variable that indicates an elapsed time from when an operation signal is received and then switching of the reception frequency band is interrupted. Note that the initial value of the switching stand-by timer TK is set at 0. The in-vehicle ECU 22 adds a predetermined constant, such as 1, to the switching stand-by timer TK loaded from the storage unit, and then overwrites and stores the value resulting from the addition in the storage unit as the switching stand-by timer TK. When the process of step C5 is complete, the in-vehicle ECU 22 proceeds with the process to step C8.

In step C8, the in-vehicle ECU 22 determines whether the switching stand-by timer TK is longer than or equal to a switching stand-by time TKth. The switching stand-by time TKth is a constant stored in the storage unit of the in-vehicle ECU 22 and is a threshold used to determine a timing at which interruption of switching of the reception frequency band is released. Note that the value of the switching stand-by time TKth is longer than the switching time TCth. The in-vehicle ECU 22 loads the value of the switching stand-by timer TK and the value of the switching stand-by time TKth from the storage unit, and determines whether the switching stand-by timer TK is longer than or equal to the switching stand-by time TKth. When the in-vehicle ECU 22 determines that the switching stand-by timer TK is longer than or equal to the switching stand-by time TKth, the in-vehicle ECU 22 proceeds with the process to step C9 and then releases interruption of switching of the reception frequency band. On the other hand, when the in-vehicle ECU 22 determines that the switching stand-by timer TIC is shorter than the switching stand-by time TKth, the in-vehicle ECU 22 returns the process to step C7.

Through the processes of step C7 and step C8, the processes of step C7 and step C8 are repeated and the reception frequency band is not switched until the switching stand-by time TKth elapses.

In step C9, the in-vehicle ECU 22 resets the switching stand-by timer TK. Specifically, the in-vehicle ECU 22 sets the switching stand-by timer TK at the initial value and then overwrites and stores the switching stand-by timer TK in the storage unit. When the process of step C9 is complete, the in-vehicle ECU 22 returns the process to step C1.

With the above described in-vehicle unit process, the reception frequency band is maintained in a frequency band that is set at the time when an initial operation signal is received in a period from when the initial operation signal is received to when the switching stand-by time TKth for the reception frequency band elapses, so it is possible to further reliably receive a successive operation signal that is successively transmitted in the frequency band.

Note that, when the in-vehicle antenna 21 is configured to receive a wireless signal in the frequency band F1 and a wireless signal in the frequency band F2 at the same time, the in-vehicle ECU 22 does not need to execute the above described in-vehicle unit process.

In addition, in the second embodiment, the in-vehicle ECU 22 executes control so that the door of the vehicle 3 is placed in a single lock state when the in-vehicle ECU 22 has received an initial operation signal and the door of the vehicle 3 is placed in a double lock state when the in-vehicle ECU 22 has received a successive operation signal; however, a control target of the in-vehicle ECU 22 is not limited to the door lock device 31. Instead, the in-vehicle ECU 22 may control another in-vehicle device in response to an initial operation signal or a successive operation signal. For example, in-vehicle ECU 22 may control an in-vehicle device, such as an electrically adjustable door mirror equipped for the vehicle 3, in response to a successive operation signal.

Third Embodiment

In the first embodiment and the second embodiment, the microcomputer 12 executes control for switching the transmission frequency band on the basis of an accepted input operation; instead, the microcomputer 12 may carry out bidirectional communication with the in-vehicle unit 2 and then execute control for switching the transmission frequency band on the basis of an accepted input operation and a response signal from the in-vehicle unit 2.

The in-vehicle antenna 21 according to a third embodiment not only receives an operation signal from the mobile antenna 13 but also transmits a wireless signal to the mobile antenna 13 in response to a command of the in-vehicle ECU 22. In addition, the mobile antenna 13 not only wirelessly transmits an operation signal but also receives a wireless signal from the in-vehicle antenna 21, and then outputs the received wireless signal to the microcomputer 12. That is, the mobile device 1 and the in-vehicle unit 2 are configured to be able to carry out bidirectional communication.

Note that, other than the in-vehicle antenna 21 and the mobile antenna 13, the configuration of the remote control system according to the third embodiment is similar to the configuration of the remote control system 100 (see FIG. 1) according to the first embodiment, so the detailed description of the above configuration other than the in-vehicle antenna 21 and the mobile antenna 13 is omitted.

Hereinafter, processes executed by the microcomputer 12 and the in-vehicle ECU 22 according to the third embodiment will be described.

When the in-vehicle ECU 22 according to the third embodiment has received an operation signal, the in-vehicle ECU 22 wirelessly transmits a communication establishment signal, indicating that the operation signal has been received, via the in-vehicle antenna 21.

Figure 9:
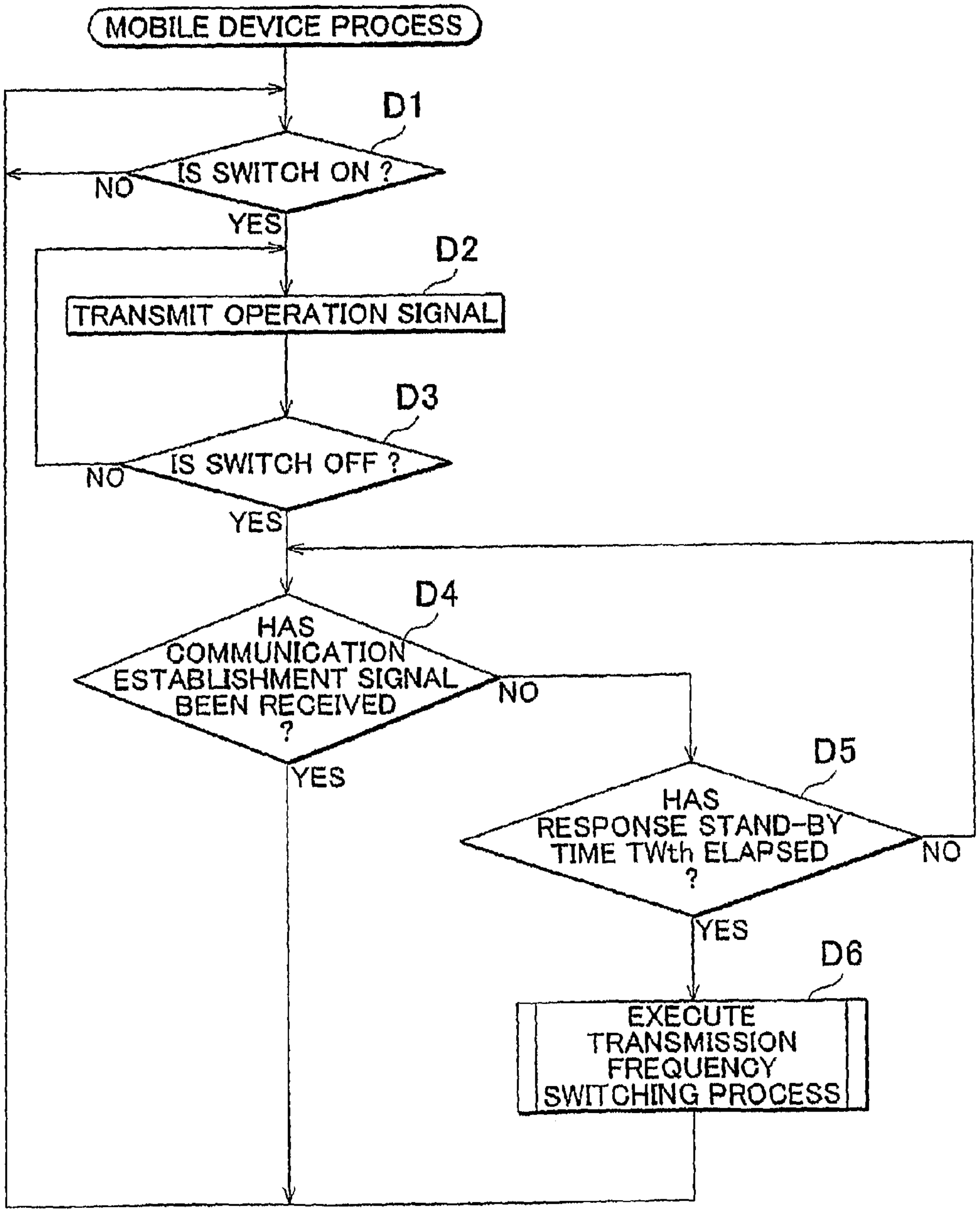
FIG. 9 is an example of a flowchart that shows a mobile device process executed by a microcomputer according to a third embodiment.

Next, a mobile device process executed by the microcomputer 12 according to the third embodiment will be described. FIG. 9 is an example of a flowchart that shows the mobile device process executed by the microcomputer 12 according to the third embodiment. The microcomputer 12 executes the mobile device process shown in FIG. 9 while the microcomputer 12 is being supplied with electric power from a battery (not shown) mounted on the mobile device 1. As the microcomputer 12 starts the process shown in FIG. 9, the microcomputer 12 initially executes the process of step D1.

In step D1, the microcomputer 12 determines whether the switch 11 is on, as in the case of the above described step A1. When the microcomputer 12 determines that the switch 11 is on the microcomputer 12 proceeds with the process to step D2. On the other hand, when the microcomputer 12 determines that the switch 11 is off, the microcomputer 12 repeats the process of step D1 and then waits until an input to the switch 11 is accepted.

In step D2, the microcomputer 12 transmits an operation signal as in the case of step A2. When the process of step D2 is complete, the microcomputer 12 proceeds with the process to step D3.

In step D3, the microcomputer 12 determines whether the switch 11 is off, as in the case of step A5. When the microcomputer 12 determines that the switch 11 is off, the microcomputer 12 proceeds with the process to step D4. On the other hand, when the microcomputer 12 determines that the switch 11 is on, the microcomputer 12 returns the process to step D2.

Through the processes from step D1 to step D3, an operation signal is wirelessly transmitted while the user is depressing the switch 11.

In step D4, the microcomputer 12 determines whether a communication establishment signal has been received. Specifically, the microcomputer 12 determines whether the mobile antenna 13 has received a communication establishment signal. When the microcomputer 12 determines that the communication establishment signal has been received, the microcomputer 12 returns the process to step D1. On the other hand; when the microcomputer 12 determines that no communication establishment signal is received, the microcomputer 12 proceeds with the process to step D5.

In step D5, the microcomputer 12 determines whether a response stand-by time TWth has elapsed. The response stand-by time. TWth is a period of time during which the microcomputer 12 waits for reception of the communication establishment signal from when the microcomputer 12 accepts an input operation. The microcomputer 12 measures an elapsed time from when the input operation is accepted in step D3 by a timer circuit, or the like. Then, the microcomputer 12 determines whether the elapsed time is longer than or equal to the response stand-by time TWth. When the microcomputer 12 determines that the response stand-by time TWth has elapsed, the microcomputer 12 proceeds with the process to step D6. On the other hand, when the microcomputer 12 determines that the response stand-by time TWth has not elapsed yet, the microcomputer 12 returns the process to step D4.

In step D6, the microcomputer 12 executes transmission frequency switching process as in the case of the process shown in FIG. 3. That is, the microcomputer 12 changes the transmission frequency band to a frequency band different from the currently set frequency band. When the process of step D6 is complete, the microcomputer 12 returns the process to step D1.

Through the processes from step D4 to step D6, when the microcomputer 12 has received a communication establishment signal by the time the response stand-by time TWth elapses, the microcomputer 12 does not switch the transmission frequency band. On the other hand, when the microcomputer 12 has not received a communication establishment signal until the response stand-by time TWth elapses, the microcomputer 12 switches the transmission frequency band.

Figures 10A, 10B, 10C:
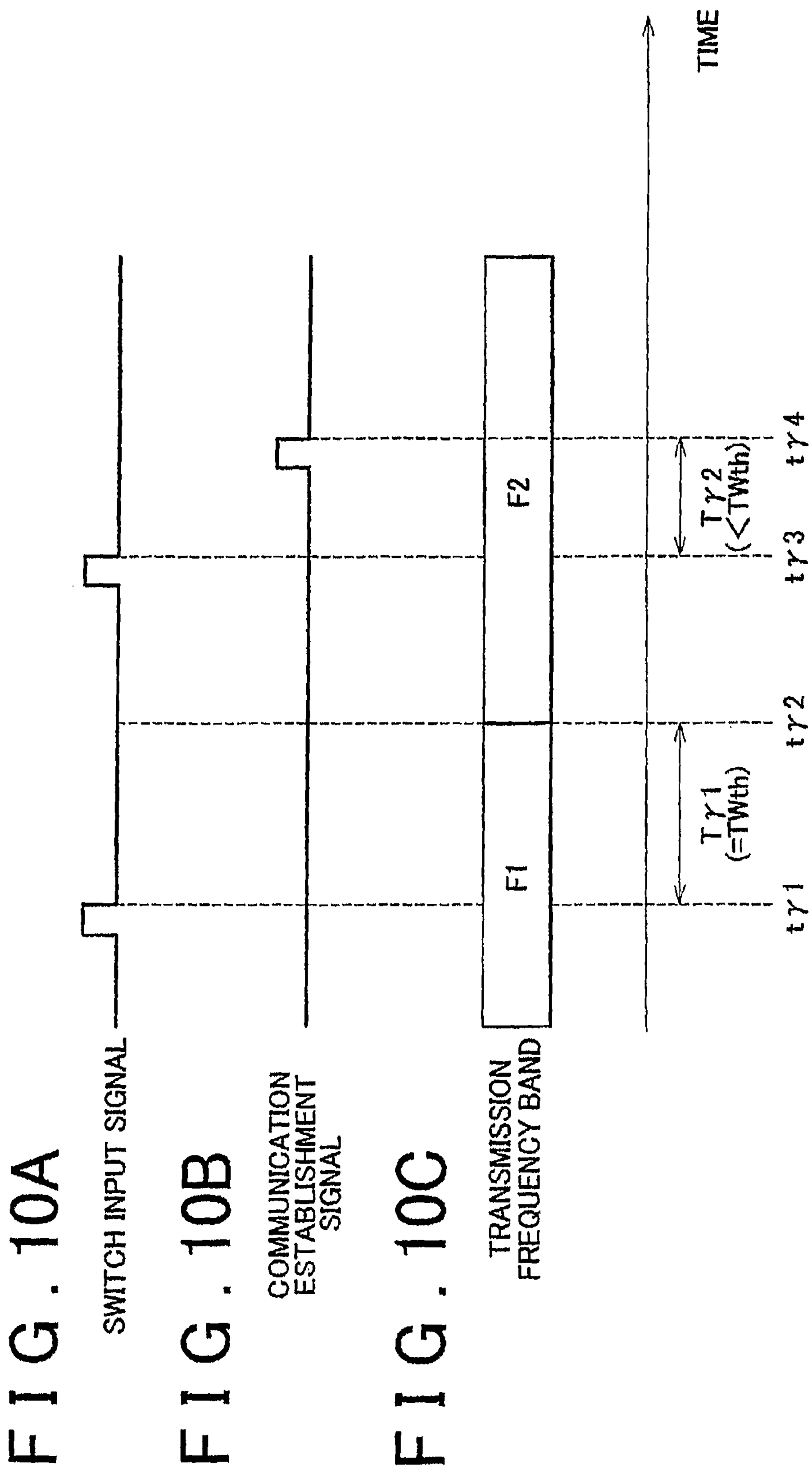
FIGS. 10A to 10C are examples of timing charts that show a state where the microcomputer according to the third embodiment switches a set transmission frequency band in response to user's input operation.

Next, a state where the microcomputer 12 according to the third embodiment switches the transmission frequency band in response to user's input operation will be described with reference to FIGS. 10A to 10C. FIGS. 10A to 10C are examples of timing charts that show a state where the microcomputer 12 according to the third embodiment switches the transmission frequency band. In FIGS. 10A to 10C, the abscissa axis represents time. In FIG. 10A, Switch Input Signal indicates a switch input signal output from the switch 11 at each instant of time. In FIG. 10B, Communication Establishment Signal indicates a communication establishment signal received by the microcomputer 12 at each instant of time. In FIG. 10C, Transmission Frequency Band indicates a frequency band set as the transmission frequency band at each instant of time.

As shown in FIG. 10A, the user depresses the switch 11 as an input operation until time tγ1, and then a switch input signal is output to the microcomputer 12 in response to the input operation. As shown in FIG. 10C, at time tγ1, the transmission frequency band is set in the frequency band F1, so the microcomputer 12 transmits the operation signal in the frequency band F1 in response to a switch input signal up to time tγ1. Then, as shown in FIG. 10B, it is assumed that the response stand-by time TWth has elapsed from time tγ1 while the microcomputer 12 remains not receiving a communication establishment signal. At time tγ2 at which the response stand-by time TWth has elapsed from time tγ1, the microcomputer 12 switches the transmission frequency band from the frequency band F1 to the frequency band F2 (from step D4 to step D6).

As described above, when the microcomputer 12 has not received a communication establishment signal, the microcomputer 12 automatically switches the transmission frequency band after a lapse of the response stand-by time. When the microcomputer 12 has not received a communication establishment signal, it is presumably highly likely that wireless communication is hard to be successfully carried out in the frequency band F1 set as the transmission frequency band. Thus, the microcomputer 12 switches the transmission frequency band to the frequency band F2 to thereby make it possible to transmit a subsequent operation signal in a frequency band different from that of the previous operation signal and improve the success rate of communication. In addition, the microcomputer 12 automatically switches the transmission frequency band, so the user does not need to carry out an operation for switching the transmission frequency band.

After time tγ2, at time tγ3, the microcomputer 12 accepts an input operation again. Then, as shown in FIG. 10B, the microcomputer 12 receives a communication establishment signal at time tγ4 before the response stand-by time TWth elapses from time tγ3. The microcomputer 12 has received the communication establishment signal at time tγ4, so the microcomputer 12 does not switch the transmission frequency band (step D4) as shown in FIG. 10C.

As described above, when the microcomputer 12 has received a communication establishment signal, the transmission frequency band is not switched, so the transmission frequency band is, maintained in the frequency band in which communication has been established. Thus, it is also possible to establish communication for a subsequent operation signal at a high probability while suppressing unnecessary switching of the transmission frequency band.

With the remote control system according to the third embodiment, it is determined whether the transmission frequency band is switched on the basis of the state whether the wireless communication is established. Thus, as in the case of the remote control system 100 according to the first embodiment, it is possible to improve the success rate of communication of the operation signal by switching the transmission frequency band with a smaller number of operations.

Note that, in the above embodiments, the mobile device 1 and the in-vehicle unit 2 sequentially switch the transmission frequency band to any one of the frequency band F1 and the frequency band F2; instead, the mobile device 1 and the in-vehicle unit 2 may switch the transmission frequency band among two or more different frequency bands.

In addition, the mobile device processes of the microcomputer 12 according to the above embodiments may be executed in combination. For example, in the second embodiment, an input operation accepted as an initial input operation after the initialization time has elapsed may be a long press input operation or may be a short press input operation, which are described in the first embodiment.

In addition, in the second embodiment, the microcomputer 12, when initial input is accepted, executes control for not switching the transmission frequency band until the initialization time elapses; instead, the microcomputer 12 may execute control for not switching the transmission frequency band only after initial input and switching the transmission frequency band for a successive input operation accepted thereafter. That is, it is applicable that the microcomputer 12, in the process of step B7 in FIG. 5, returns the process to step B1 when the value of the successive operation counter N is smaller than or equal to 1, and proceeds with the process to step B8 when the value of the successive operation counter N is larger than 2, and, in addition, the process of step B13 is omitted.

With the above process, the microcomputer 12 does not switch the transmission frequency band when the microcomputer 12 accepts an initial input operation. That is, after initial input, an operation signal corresponding to a second input operation accepted is transmitted in the same frequency band as that of the initial input operation. Thus, when communication of an initial input operation is successfully carried out, communication of an operation signal corresponding to a second input operation may be successfully carried out at a high probability.

In addition, with the above process, after a second input operation, the transmission frequency band is switched each time an input operation is carried out until the initialization time elapses. Thus, when the user needs to intentionally switch the transmission frequency band, it is not necessary to depress the switch 11 a number of times.

The invention claimed is:

1. A remote control system comprising:

a mobile device that includes an input unit that accepts user's input operation;

an operation signal transmission unit that wirelessly transmits an operation signal corresponding to the input operation while the input operation is being carried out;

a frequency switching determination unit that determines whether to switch a transmission frequency band for transmitting the operation signal among a plurality of frequency bands, wherein the frequency switching determination unit determines whether to switch the transmission frequency band from a first frequency band to a second frequency band on the basis of at least any one of a manner of the input operation and a state of wireless communication; and an initial input determination unit that determines an input operation, which is accepted after a predetermined initialization time has elapsed from when the previous input operation is accepted, as an initial input operation, a transmission frequency switching unit that switches the transmission frequency band when the frequency switching determination unit determines to switch the transmission frequency band; and a receiver that is connected to a control target and that includes an operation signal reception unit that receives the operation signal; and a control unit that controls the control target on the basis of the operation signal received by the operation signal reception unit, wherein the frequency switching determination unit, when a predetermined condition is satisfied, determines not to switch the transmission frequency band until the initialization time elapses from when the initial input operation is accepted, and determines to switch the transmission frequency band when the initialization time has elapsed from when the initial input operation is accepted, and the frequency switching determination unit determines not to switch the transmission frequency band even when an input operation is accepted until the time the initialization time elapses from when the initial input operation is accepted.

2. The remote control system according to claim 1, wherein the mobile device further includes an operation type determination unit that determines whether the type of the accepted input operation is a first input operation or a second input operation different from the first input operation on the basis of details of the input operation; and a storage unit that stores the type of a previously accepted input operation, wherein the frequency switching determination unit determines whether to switch the transmission frequency band each time the user completes the input operation, and, when the type of the previously accepted input operation differs from the type of a currently accepted input operation, determines not to switch the transmission frequency band after the user completes the current input operation.

3. The remote control system according to claim 2, wherein the input unit is a press-down switch, the operation type determination unit, when the details of the accepted input operation are such that the switch device is continuously depressed for a predetermined period of time or longer, determines that the input operation is the first input operation, and, when the details of the accepted input operation are such that a period of time during which the switch device is continuously depressed does not reach the predetermined period of time, determines that the input operation is the second input operation, the operation signal transmission unit wirelessly transmits a first operation signal in the case of the first input operation, and wirelessly transmits a second operation signal in the case of the second input operation, and the frequency switching determination unit determines whether to switch the transmission frequency band each time the user completes the input operation, and, when the previously accepted input operation is the second input operation and a currently accepted input operation is the first input operation, determines not to switch the transmission frequency band after the user completes the current first input operation.

4. The remote control system according to claim 3, wherein the receiver is equipped for a vehicle, the control target includes a door closing device that closes a door equipped for the vehicle and a locking device that locks the door, and the control unit executes control for activating the door closing device to close the door when the operation signal reception unit has received the first operation signal, and executes control for activating the locking device to lock the door when the operation signal reception unit has received the second operation signal.

5. The remote control system according to claim 1, wherein the mobile device further includes a successive input determination unit that determines an input operation, which is accepted by the time the initialization time elapses from when the initial input operation is accepted, as a successive input operation; and an input counting unit that counts the number of inputs of a successive input operation accepted by the time the initialization time elapses from when the initial input operation is accepted, wherein the frequency switching determination unit, when the counted number of inputs is smaller than a predetermined threshold by the time the initialization time elapses from when the initial input operation is accepted, determines not to switch the transmission frequency band, and, when the counted number of inputs is larger than or equal to the threshold, determines to switch the transmission frequency band at that time.

6. The remote control system according to claim 1, wherein the receiver further includes a reception frequency switching unit that sequentially switches a reception frequency band, which is a frequency band of the operation signal received by the operation signal reception unit, among the plurality of frequency bands each time a predetermined period of time elapses; and a reception frequency band switching interruption unit that, when the operation signal has been received, interrupts switching of the reception frequency band until at least the initialization time elapses from when the operation signal has been received.

7. The remote control system according to claim 1, wherein the mobile device further includes a successive input determination unit that determines an input operation, which is accepted by the time the initialization time elapses from when the initial input operation is accepted, as a successive input operation, wherein the operation signal transmission unit, when the initial input operation is accepted, wirelessly transmits an initial operation signal, and, when the successive input operation is accepted, wirelessly transmits a successive operation signal, the receiver is equipped for a vehicle, the control target is a locking device that places a door of the vehicle in any one of a first locking state where the door is not openable from outside the vehicle and is openable from inside the vehicle and a second locking state where the door is not openable from both outside and inside the vehicle, and the control unit executes control for activating the locking device to place the door in the first locking state when the operation signal reception unit has received the initial operation signal, and executes control for activating the locking device to place the door in the second locking state when the operation signal reception unit has received the successive operation signal.

8. The remote control system according to claim 1, wherein the receiver further includes an establishment notification unit that, when the operation signal has been received, transmits a communication establishment signal that indicates that communication of the operation signal is established, and the mobile device further includes an establishment signal reception unit that receives the communication establishment signal, wherein the frequency switching determination unit, when the communication establishment signal is received by the time a predetermined stand-by time elapses from when the operation signal is transmitted, determines not to switch the transmission frequency band, and, when the communication establishment signal is not received by the time the predetermined stand-by time elapses from when the operation signal is transmitted, determines to switch the transmission frequency band when the stand-by time has elapsed.

9. The remote control system according to claim 1, wherein the mobile device further includes a successive input determination unit that determines an input operation, which is accepted by the time the initialization time elapses from when the initial input operation is accepted, as a successive input operation, wherein the frequency switching determination unit determines whether to switch the transmission frequency band each time the user completes the input operation, wherein the frequency switching determination unit determines not to switch the transmission frequency band when the initial input operation is accepted, and determines to switch the transmission frequency band when the successive input operation is accepted.

10. The remote control system according to claim 1, wherein the frequency switching determination unit determines whether to switch the transmission frequency band on the basis of a history of input operations accepted by the input unit.

11. The remote control system according to claim 1, wherein the frequency switching determination unit determines whether to switch the transmission frequency band on the basis of the state whether the wireless communication is established.

12. A mobile device comprising:

an input unit that accepts user's input operation;

an operation signal transmission unit that wirelessly transmits an operation signal corresponding to the input operation while the input operation is being carried out;

a frequency switching determination unit that determines whether to switch a transmission frequency band for transmitting the operation signal among a plurality of frequency bands, wherein the frequency switching determination unit determines whether to switch the transmission frequency band from a first frequency band to a second frequency band on the basis of at least any one of a manner of the input operation and a state of wireless communication; and an initial input determination unit that determines an input operation, which is accepted after a predetermined initialization time has elapsed from when the previous input operation is accepted, as an initial input operation, a transmission frequency switching unit that switches the transmission frequency band when the frequency switching determination unit determines to switch the transmission frequency band, wherein the frequency switching determination unit, when a predetermined condition is satisfied, determines not to switch the transmission frequency band until the initialization time elapses from when the initial input operation is accepted, and determines to switch the transmission frequency band when the initialization time has elapsed from when the initial input operation is accepted, and the frequency switching determination unit determines not to switch the transmission frequency band even when an input operation is accepted until the time the initialization time elapses from when the initial input operation is accepted.

* * * * *